(12) United States Patent
Tomishima

(10) Patent No.: US 6,295,254 B1
(45) Date of Patent: Sep. 25, 2001

(54) SEEK CONTROL METHOD FOR A DISK DEVICE USED FOR READING/WRITING DATA FROM AND TO A DISK RECORDING MEDIUM

(75) Inventor: Yuichiro Tomishima, Sendai (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/302,031

(22) Filed: Apr. 29, 1999

(30) Foreign Application Priority Data

May 21, 1998 (JP) .................................................. 10-139860

(51) Int. Cl.$^7$ ....................................................... G11B 7/09
(52) U.S. Cl. ..................... 369/44.28; 369/44.29; 369/53.29
(58) Field of Search ................... 369/44.28, 32, 369/54, 44.29, 44.27, 44.34, 58, 44.35, 53.29, 53.28; 360/78.04, 78.05

(56) References Cited

U.S. PATENT DOCUMENTS

| | | | | |
|---|---|---|---|---|
| 5,563,856 | * | 10/1996 | Kim | 369/44.28 |
| 5,844,871 | * | 12/1998 | Maezawa | 369/44.28 |
| 6,137,751 | * | 10/2000 | Kim | 369/32 |
| 6,154,429 | * | 11/2000 | Grimm | 369/58 |

FOREIGN PATENT DOCUMENTS

5054401 * 3/1993 (JP) .

* cited by examiner

Primary Examiner—Thang V. Tran
(74) Attorney, Agent, or Firm—Dilworth & Barrese, LLP

(57) ABSTRACT

A method for performing a seek control operation for a disk device of the type having a pickup for reading/writing data from and to a disk is provided. The method includes the steps of counting mirror signals generated for every revolution of the disk recording medium, where each mirror signal corresponds to one of the tracks radially arranged on the disk recording medium; moving a pickup until the counted number of mirror signals is equal to a predetermined number of tracks required for the pickup to pass to reach a target track. The method further includes the steps of checking respective intervals of successive mirror signals; determining if there is a difference in length between intervals of two successive mirror signals; and executing a correction mode by adding or subtracting a correction value to the counted number of mirror signals if there is a difference in length between intervals of two successive mirror signals.

11 Claims, 4 Drawing Sheets

SEEK CONTROL METHOD FOR A DISK DEVICE USED FOR READING/WRITING DATA FROM AND TO A DISK RECORDING MEDIUM

BACKGROUND

1. Field of the Invention

The present invention relates to seek control technology, and in particular to a seek control method for a disk device used for reading/writing data from and to a disk recording medium, such as a compact disk (CD) or a compact disk-read only memory (CD-ROM).

2. Description of the Related Art

In a disk device, such as a CD-ROM drive, a seek control operation is performed by calculating the number of tracks a pickup has to pass to reach the target track from the present track, and moving the pickup until the number of tracks passed equals the number of tracks calculated.

A generally well known seek method, which includes the step of calculating the number of tracks the pickup passes, is a track zero cross detection seek. The track zero cross detection seek is a seek method which samples a zero cross point or an arbitrary point on the disk for determining when the disk has made one complete revolution. The zero cross point is sampled by detecting a tracking error signal as the pickup moves in a radial direction of the disk and zero crossing the tracking error signal with a desired reference voltage. Every time the zero point is sampled, mirror signals are generated and counted by a CPU, where each mirror signal represents one track in a track pitch direction for every associated period of time. Accordingly, the pickup is moved until the counted number of mirror signals is equal to the calculated number of passing tracks required to reach the target track.

Although the track zero cross detection seek is especially advantageous in seeking the target track, even in a high rate of disk revolution, the operation sometimes misses the mirror signals. For example, if the disk has defects, such as a crack, fingerprints, dust, or stains, the tracking error signal may not be zero crossed with the desired reference voltage, thereby resulting in missing mirror signals. Further, even though there may not be any defects, mirror signals may still be missed due to the occurrence of a servo error, such as the occurrence of a focus drop which may be generated during the seek operation. The servo error may cause a miscount between the counted number of mirror signals and the number of actually passed tracks, thereby causing an inaccurate seek operation.

Accordingly, a need exists for a seek control method which accurately moves a pickup to a target track even when mirror signals are missed or miscounted during a seek operation.

SUMMARY

The present invention provides a seek control method for a disk device used for reading/writing data from and to a disk recording medium. The method includes the steps of counting mirror signals generated for every revolution of the disk recording medium, where each mirror signal corresponds to one of the tracks radially arranged on the disk recording medium; moving a pickup until the counted number of mirror signals is equal to a predetermined number of tracks required for the pickup to pass to reach a target track. The method further includes the steps of checking respective intervals of successive mirror signals; determining if there is a difference in length between intervals of two successive mirror signals; and executing a correction mode by adding or subtracting a correction value to the counted number of mirror signals if there is a difference in length between intervals of two successive mirror signals.

Since a disk has almost equal track widths at different portions thereof, intervals of mirror signals generated in association with successive tracks in a normal seek operation have almost equal lengths. Therefore, if the intervals of successive mirror signals are not equal in length, it is then determined that there are defects on the disk and/or a servo error occurred which resulted in a mirror signal miscount. Accordingly, one of the following methods is then executed in accordance with the present invention in order to counteract the above mentioned defects and/or any focus servo errors.

A first method entails executing a correction mode which is associated with the addition or subtraction of the correction value to the counted number of mirror signals required to reach a target track. According to this method, even when a miscounting of the mirror signals occurs due to an abnormality of the disk or servo system, it is possible to continuously move the pickup in accordance with a seek control which has been corrected by the execution of the correction mode. Accordingly, the pickup can be accurately moved to the target track. Moreover, this method prevents the drive from being damaged due to a seek rush where the pickup may move outside the periphery of a disk reading/writing area.

Another method, which deals with the occasion that there is a difference in length between intervals of successive mirror signals, is to forcibly stop the pickup. In this case, the seek operation is stopped immediately after a seek rush occurs. Accordingly, this method prevents the pickup from moving outside the periphery of the disk reading/writing area which may damage the pickup and the drive.

The determination of whether or not there is a difference in length between intervals of successive mirror signals can be appropriately achieved by defining the disk region between an initiation track and a target track into an acceleration region, a maximum speed region, and a deceleration region. Based on the moving speed of the pickup as driven by a feed motor during the seek operation, the above determination, i.e., if there is a difference in length between intervals of successive mirror signals, is performed in association with the differently defined disk regions. Practically, the length of mirror signal intervals varies according to the moving speed of the pickup. Therefore, the length of mirror signal intervals is different in different regions of the disk.

For example, assuming that "Mi" represents the preceding one of two successive mirror signal intervals, and "Mo" represents the following mirror signal interval, the successive mirror signal intervals satisfy a relationship of "Mi>Mo" in the acceleration region, "$M_i=M_o$" in the maximum speed region, and "$M_i<M_o$" in the deceleration region. Accordingly, there is a difference between successive mirror signal intervals when the mirror signal intervals do not satisfy the above mentioned relationships.

According to this definition of the various areas of the disk, in deciding whether to execute the correction mode or the forced stop mode, the correction mode is executed when the following one of mirror signals associated with two successive tracks has been counted within a predetermined time from the beginning of the preceding mirror signal whereas the forced stop mode is executed when the following mirror signal has been counted in excess of the predetermined time.

If the pickup is forcibly stopped several times during the seek operation, a loss occurs in seek time. In order to solve this problem, the forced stop mode is executed only when there is a high possibility of a seek rush exceeding a predetermined time. Accordingly, it is possible to minimize the loss in seek time by setting the predetermined time differently for the acceleration region, the maximum speed region, and the deceleration region. Therefore, it is possible to make an appropriate determination of whether to forcibly stop the pickup for each region.

DETAILED DESCRIPTION OF PREFERRED EMBODIMENTS

Figure 1:
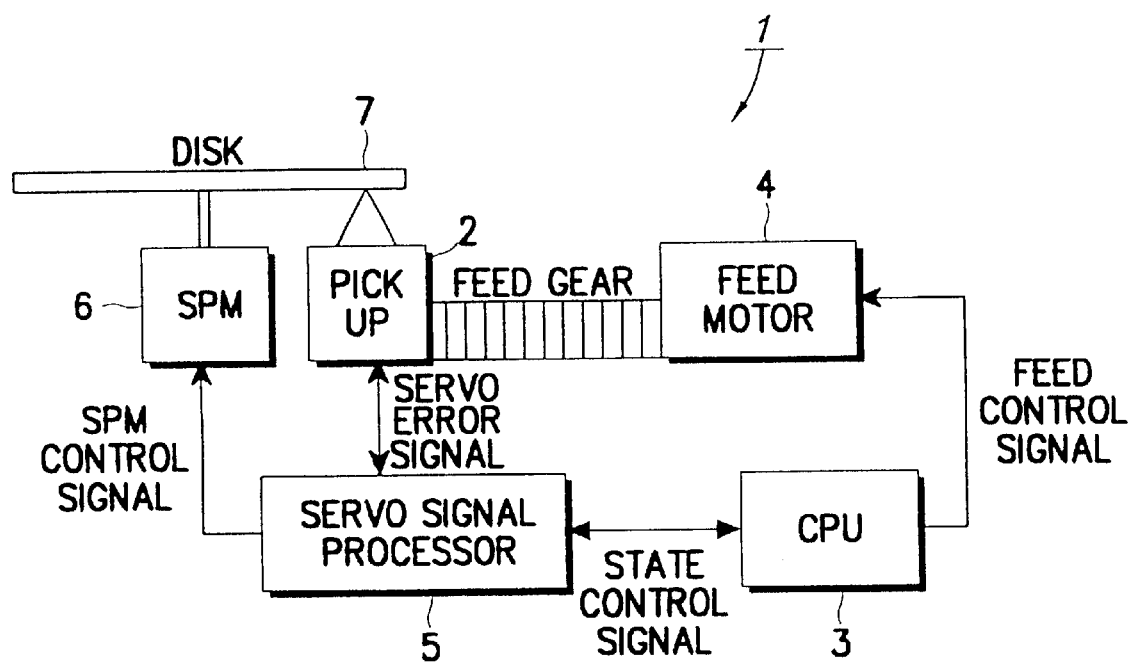
FIG. 1 is a block diagram illustrating a CD-ROM drive system in which the method of the present invention is utilized.
Figure 2:
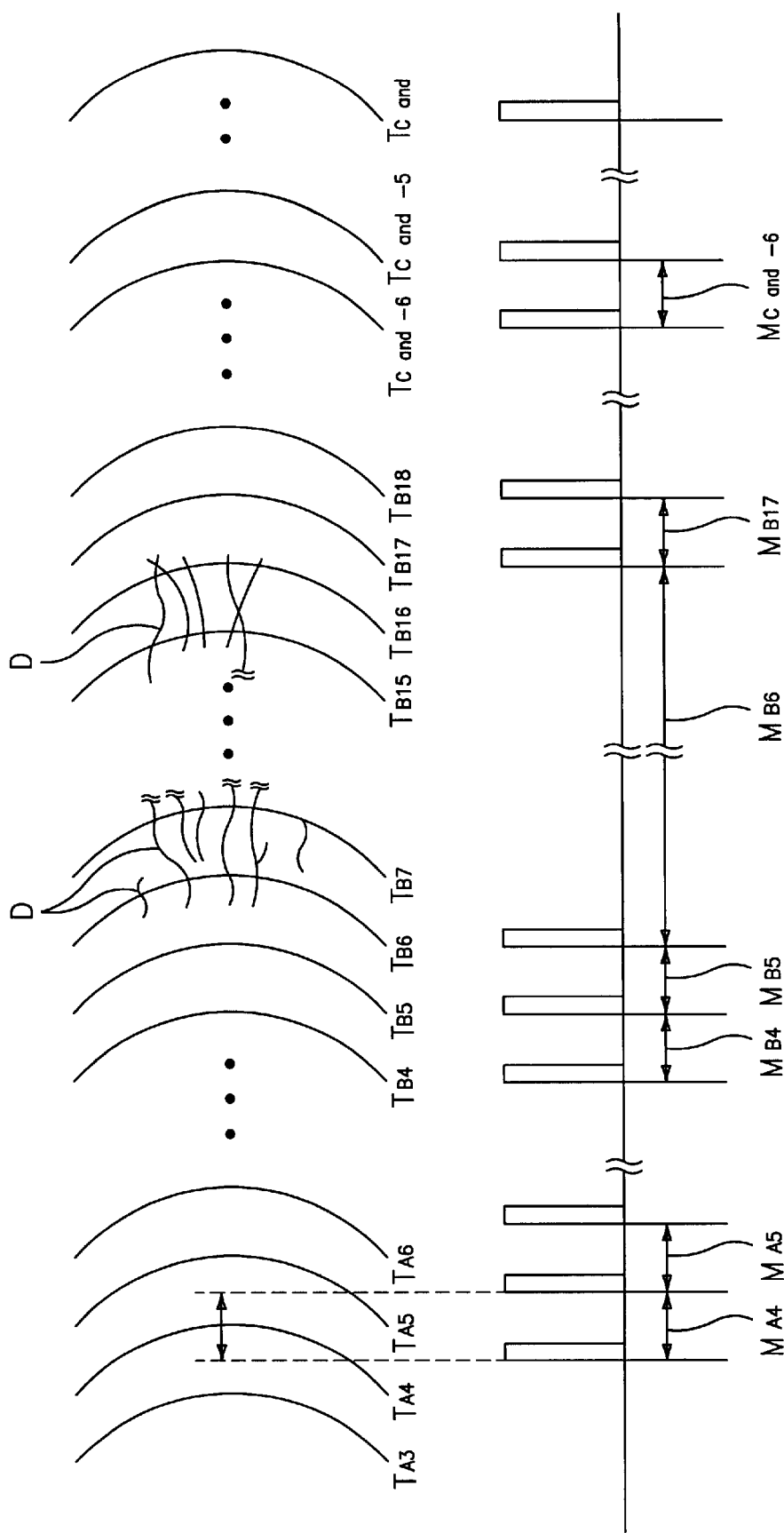
FIG. 2 is a diagram illustrating disk tracks and respective mirror signals.

It is to be understood that in the following description of preferred embodiments, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

A preferred embodiment of a seek control method for a disk device used for reading/writing data from and to a disk recording medium according to the present invention will now be described with reference to FIGS. 1–4.

Figure 3:
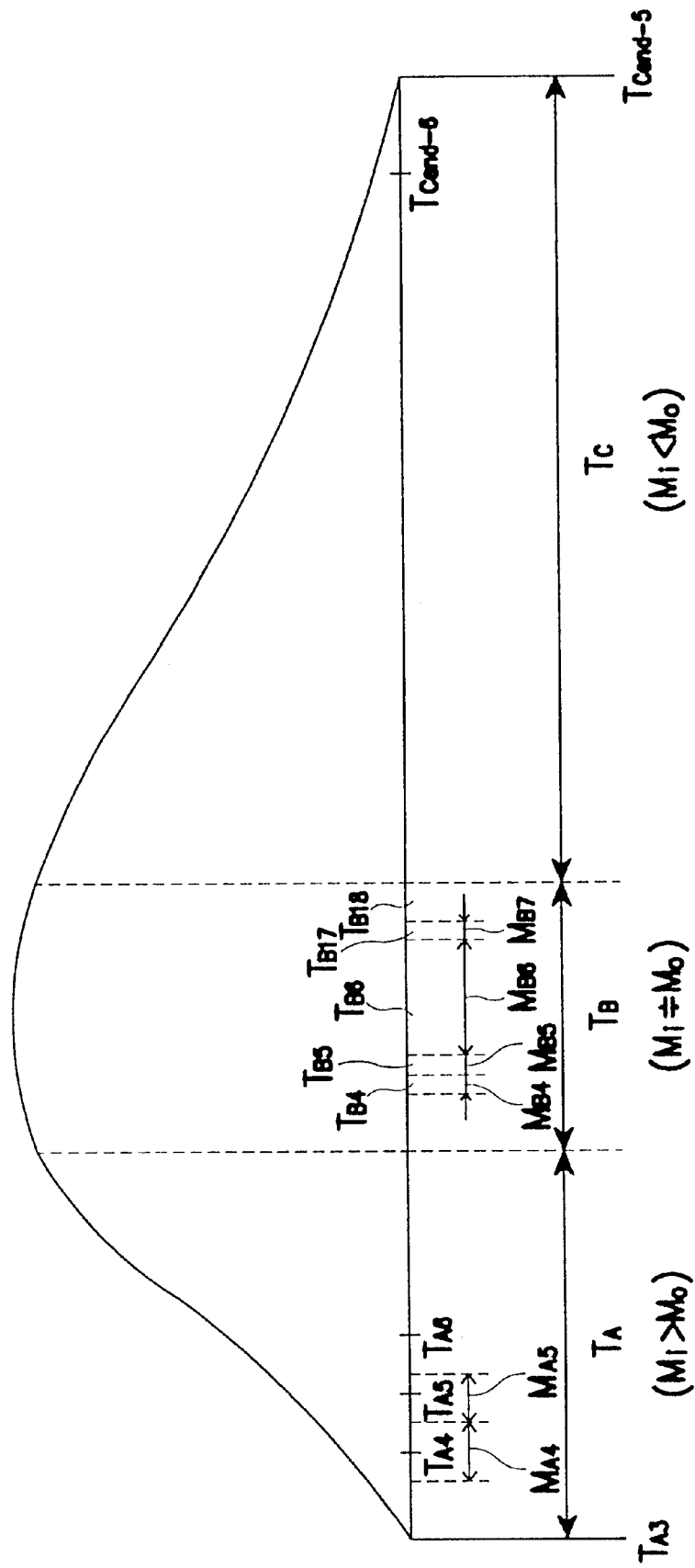
FIG. 3 is a graph illustrating a variation in the speed of a pickup and a variation in the length of the mirror signal intervals shown in FIG. 2.

With reference to FIG. 1, there is shown a schematic diagram of a CD-ROM drive 1 adapted as a reproducing device. The drive 1 includes a pickup 2, a CPU 3, a feed motor 4, a servo signal processor 5, a spindle motor (SPM) 6, and a disk 7. A seek control will now be described with reference to FIGS. 2 and 3 in which the pickup 2 is controlled by the CPU 3 to travel from a present track $T_{A3}$ located in an acceleration region $T_A$ to a target track $T_{Cend-5}$ located in a deceleration region $T_C$ via a maximum speed region $T_B$ having a defect, i.e., a scratch D. The acceleration region $T_A$ shown in FIG. 3 is a disk region where the pickup 2 is gradually accelerated from a movement initiation track (the track $T_{A3}$ in the illustrated case) by the feed motor 4 upon receiving a feed control signal from the CPU 3. The maximum speed region $T_B$ is a disk region where the moving speed of the pick up 2 reaches a maximum speed and the deceleration region $T_C$ is a disk region where the pickup 2 is gradually decelerated by the feed motor 4 until it is stopped at the target track (the track $T_{Cend-5}$ in the illustrated case). These regions may vary depending on the number of tracks between the initiation track and the target track.

Figure 4:
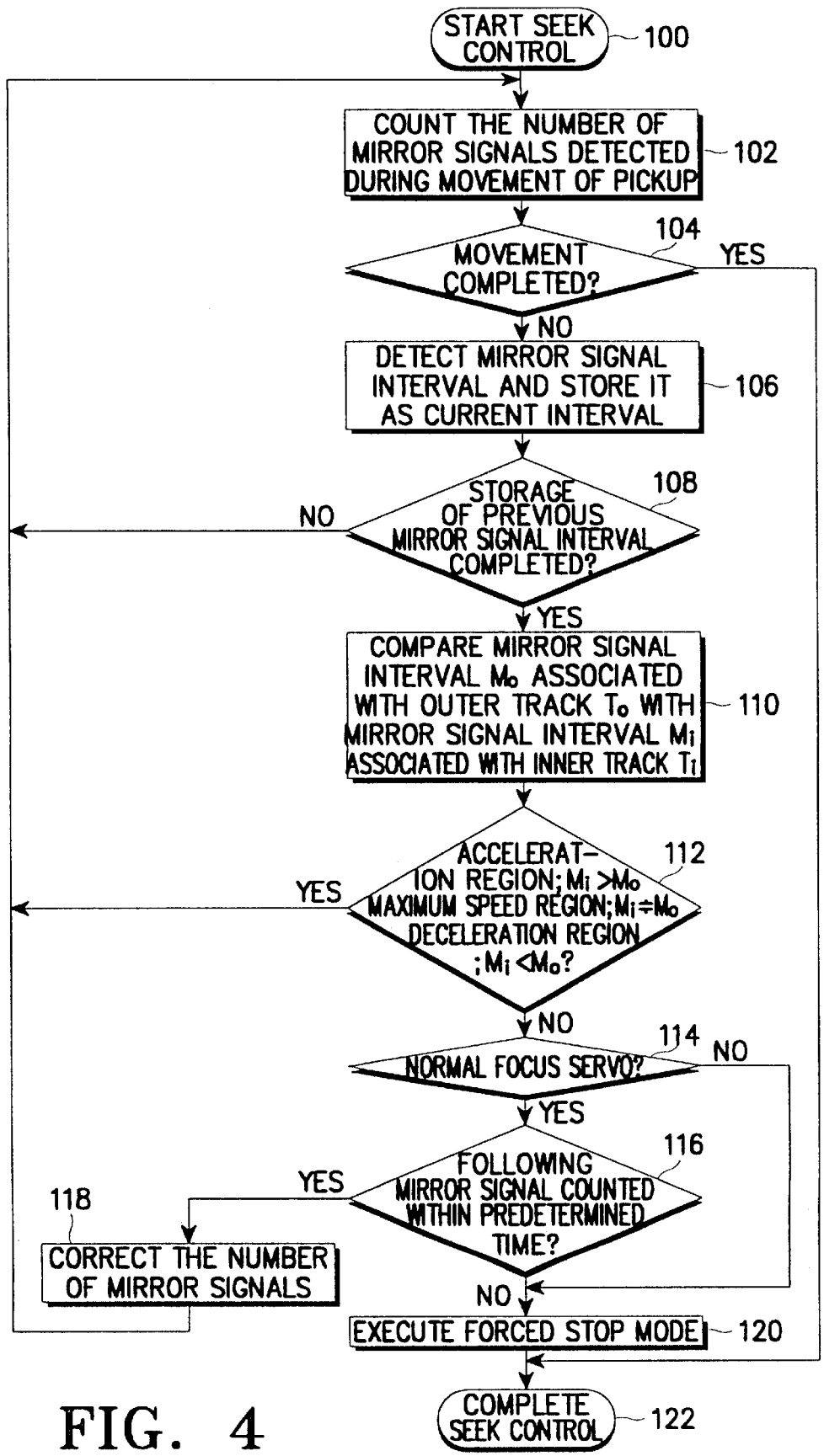
FIG. 4 is a flowchart illustrating a seek control method in accordance with the present invention.

With reference to FIG. 4, in response to a seek initiation signal, the CD-ROM drive 1 initiates a seek control after calculating the number of tracks the pickup 2 has to pass, based on time information obtained by reading a sub-code stored on the present track $T_{A3}$ and time information associated with the target track $T_{A3}$ (step 100), to reach the target track $T_{A3}$. When the pickup 2 moves from the present track $T_{A3}$ to the track $T_{A4}$ (FIG. 2), the CPU 3 adds 1 to the counted number of mirror signals until the pickup 2 reaches the track $T_{A4}$ (step 102 of FIG. 4).

At this time, the CPU 3 determines whether or not the counted number of mirror signals is equal to the calculated number of tracks required to be passed to reach the target track $T_{A4}$, namely, whether or not the movement of the pickup 2 should be terminated (step 104). If the counted number of mirror signals is not equal to the calculated number of passing tracks, then the seek control method continues to the next step.

Thereafter, the CPU 3 detects an interval $M_{A4}$ of a mirror signal generated in association with the track $T_{A4}$, and stores the detected mirror signal interval $MA_4$ to a random access memory (RAM) (step 106). The CPU 3 then compares the mirror signal interval $M_{A4}$ with a mirror signal interval associated with the previous track $T_{A3}$ (step 110). However, there is no mirror signal interval stored in association with the previous track $T_{A3}$ because track $T_{A3}$ is a seek initiation track (step 108). Thus, the CPU 3 returns to step 102 and adds 1 to the counted number of mirror signals created until the pickup 2 moves to track $T_{A5}$. Thereafter, the CPU 3 detects a mirror signal interval $M_{A5}$ associated with track $T_{A5}$, and stores it (step 106).

The CPU 3 then compares the present mirror signal interval $M_{A5}$ with the previous mirror signal interval $M_{A4}$, thereby determining whether or not the present mirror signal interval $M_{A5}$ has an abnormal length (steps 108 and 110). In the illustrated case, the tracks $T_{A4}$ and $T_{A5}$ are placed in a region corresponding to the acceleration region $T_A$ of the pickup 2, as shown in FIG. 3. In the acceleration region $T_A$, the pickup 2 moves from a track $T_i$ of the disk (namely, the track $T_{A4}$) to a following track $T_o$ (namely, the track $T_{A5}$) at an accelerated speed. That is, the time it takes for the pickup 2 to move a unit of distance between the tracks $T_{A4}$ and $T_{A5}$ decreases.

In this regard, the mirror signal intervals $M_i$ and $M_o$ respectively associated with the successive tracks $T_i$ and $T_o$ have a general relationship of $M_i > M_o$. If this relationship is not established, then there may be a high possibility that no mirror signal is created in association with the track $T_o$ due to servo errors or defects existing on the disk. To this end, the CPU 3 checks whether or not the relationship of $M_i > M_o$ is established between the mirror signal intervals $M_{A4}$ and $M_{A5}$ (step 112). Between the mirror signal intervals $M_{A4}$ and $M_{A5}$, the relationship of $M_i > M_o$ is established because there is no defect on the track $T_{A5}$ (see FIG. 2) and the mirror signal interval $M_{A5}$ associated with the track $T_{A5}$ is shorter than the mirror signal interval $M_{A4}$ associated with the track $T_{A4}$. Thus, the CPU 3 returns to step 102, and repeats the above mentioned seek control for the tracks following the track $T_{A5}$ in the acceleration region $T_A$.

After completing the seek control for tracks associated with the acceleration region $T_A$, the CPU 3 executes a seek control for tracks associated with the maximum speed region $T_B$. That is, the CPU 3 carries out operations for incrementing the counted number of mirror signals and checking the mirror signal interval for tracks $T_{B4}$, $T_{B5}$, $T_{B6}$ ... associated with the maximum speed region $T_B$ (steps 102 and 106).

In the maximum speed region $T_B$, a relationship of $M_i = M_o$ is established between inner and outer tracks $T_i$ and $T_o$ adjacent to each other. For each track of the maximum speed region $T_B$, accordingly, it is determined whether or not the relationship of $M_i=M_o$ is established (step 110). The disk illustrated in FIG. 2 has defects D extending from tracks $T_{B6}$ to $T_{B16}$, so no mirror signals are created in association with tracks $T_{B6}$ to $T_{B16}$. For this reason, the CPU 3 stores, in the RAM, an interval beginning at the leading end of the track $T_{B6}$ and completing at the trailing end of the track $T_{B16}$, as the mirror signal interval associated with the track $T_{B6}$ (step 106).

It is then determined, for the track $T_{B6}$, whether or not the relationship of $M_i=M_o$ is satisfied between the present mirror signal interval $M_{B6}$ and the previous mirror signal interval $M_{B5}$ (steps 110 and 112). However, since the present mirror signal interval $M_{B6}$ is longer than the previous mirror signal interval $M_{B5}$ by 10 tracks, the relationship of $M_{B5}=M_{B6}$ is not established. The CPU 3 thus recognizes that the present mirror signal interval $M_{B6}$ is an abnormal interval resulting from missing mirror signals associated with tracks following track $T_{B6}$. In order to compensate for this error, the CPU 3 then executes step 114 of FIG. 4.

At step 114, it is identified whether or not the focus servo is normal. If there are focus errors, then the amount of light reflecting from the disk is reduced, thereby resulting in no creation of mirror signals. Where there is a focus error, the servo signal processor 5 outputs a state signal, indicative of a focus drop, to the CPU 3. In response to the state signal, the CPU 3 executes a forced stop mode of the pickup 2 in order to prevent a seek rush in advance (step 120), and stops the entire servo system by control signals. Thereafter, the CPU 3 completes seek control (step 122). The CPU 3 then reads out a sub-code at a stopped position of the pickup 2, thereby identifying the current time. Based on the identified current time, the CPU 3 calculates a deviation from the target track $T_{Cend-5}$ in terms of the number of tracks. Based on the result of the calculation, the CPU 3 executes again seek control from step 100, thereby moving the pickup 2 to the target track $T_{Cend-5}$.

Meanwhile, when it is determined at step 114 that the focus servo is normal, the method proceeds to step 116 where it is determined whether or not a mirror signal counting carried out after the counting of the mirror signal associated with track $T_{B6}$ (in the illustrated case, a mirror signal counting associated with the track $T_{B17}$) has been achieved within a predetermined counting time from the beginning of the mirror signal interval $M_{B6}$. The predetermined counting time is a time interval from the beginning of a mirror signal until a mirror signal following the earlier mirror signal is counted. Such a predetermined counting time is set in the CPU 3 for the acceleration region $T_A$, the maximum speed region $T_B$ and the deceleration region $T_C$, respectively. Where the mirror signal counting carried out after the counting of the mirror signal associated with the track $T_{B6}$ (in the illustrated case, the mirror signal counting associated with the track $T_{B17}$) has been achieved within a predetermined counting time, the CPU 3 executes a mirror signal miscount correction mode (step 118).

On the other hand, where the mirror signal counting has not been achieved within the predetermined counting time, it is determined that there is a high possibility of a seek rush. In order to prevent such a seek rush, the CPU 3 executes a forced stop mode for the pickup 2 (step 120) In the miscount correction mode at step 118, the CPU 3 performs an operation for dividing the present mirror signal interval $M_{B6}$ by the previous period $M_{B5}$ stored in the CPU 3, and then performs a plus correction for adding the quotient of the division to the current counted number of mirror signals. For example, if the present mirror signal interval $M_{B6}$ is 400 microseconds, and the previous mirror signal interval $M_{B5}$ is 40 microseconds, the CPU 3 then corrects the current counted number of mirror signals by carrying out a plus counting operation, namely, dividing 400 by 40, thereby obtaining a quotient of 10, and then adding the quotient of 10 to the current counted number of mirror signals.

If a correction for the counted number of mirror signals is not performed in the above case, the pickup 2 then moves radially outwards by 10 tracks. As a result, the pickup 2 passes the target track $T_{Cend-5}$ of the deceleration region $T_C$ and then the last track $T_{Cend}$ of the disk while erroneously determining, as a target track, a phantom track located radially outwardly from the last track $T_{Cend}$ by 5 tracks. In this case, the pickup 2, which is decelerated in speed under the control of the feed motor 4, may be stopped after striking against a portion of the drive. As a result, the pickup 2 or other elements of the drive may be damaged. To this end, in the CD-ROM drive 1 of the illustrated embodiment, the above mentioned mirror signal miscount correction is executed. Accordingly, it is possible to achieve an accurate seek control for accurately moving the pickup 2 to the target track $T_{Cend-5}$ even if there are defects, such as scratches, resulting in a miscount of mirror signals.

After completing the miscount correction for the mirror signals, the CPU 3 repeatedly executes seek control as described above for every track following the track $T_{B17}$ (steps 102 to 104). When the pickup 2 reaches the target track $T_{Cend-5}$, the current counted number of mirror signals is equal to the calculated number of passing tracks. In this state, accordingly, the pickup 2 completes its movement (step 104). Thus, the entire seek control operation is completed (step 122).

On the other hand, if it is determined at step 116 that the mirror signal counting carried out after the counting of the mirror signal associated with track $T_{B6}$ (in the illustrated case, a mirror signal counting associated with track $T_{B17}$) has been achieved in excess of the predetermined counting time, the CPU 3 determines that there is a high possibility of a seek rush. Accordingly, the CPU 3 executes a forced stop mode for the pickup 2 in order to prevent a seek rush (step 120), and then completes the entire seek control operation (step 122). In this case, the CPU 3 also reads out a sub-code at the stopped position of the pickup 2, thereby identifying the current time. Based on the identified current time, the CPU 3 calculates a deviation of the target track $T_{Cend-5}$ in terms of the number of tracks. Based on the result of the calculation, the CPU 3 tries again a seek control from step 100, so as to move the pickup 2 to the target track $T_{cend-5}$.

Although both the mirror signal miscount correction and the forced stop of the pickup are performed to prevent a seek rush in the illustrated embodiment of the present invention, it may be possible to achieve a desired seek control by performing only one of these operations.

In the above embodiment, the counted number of mirror signals is corrected. However, a seek control having the same effect as that of the illustrated embodiment may be achieved by appropriately reducing the counted number of passing tracks to the target track. That is, a subtraction correction for the counted number of passing tracks may be carried out.

Although a seek control for moving the pickup from the inner periphery to the outer periphery of a disk has been described in the illustrated embodiment, a seek control for moving the pickup from the outer periphery to the inner periphery of the disk may also be carried out in the same manner.

As apparent from the above description, the present invention provides a seek control method capable of allowing a pickup to move accurately to a target track even when a miscounting of mirror signals or a focus error occurs during a seek operation due to defects, such as scratches, fingerprints, or stains, on the surface of the disk. In accordance with the present invention, it is also possible to prevent a seek rush caused by a mirror signal miscount, thereby preventing the drive, including the pickup, from being damaged.

While this invention has been described in connection with what is presently considered to be the most practical and preferred embodiment, it is to be understood that the invention is not limited to the disclosed embodiment. The invention can cover various modifications within the spirit and scope of the appended claims.

What is claimed is:

1. A method for performing a seek control operation for a disk device of the type having a pickup for reading/writing data from and to a disk, said method comprising the steps of:
   (a) moving the pickup of the disk device towards a target track of the disk;
   (b) counting the number of mirror signals detected during movement of the pickup, where each mirror signal is associated with a respective track radially arranged on the disk;
   (c) determining if movement of the pickup has been completed by comparing the counted number of mirror signals to a predetermined number of tracks required to reach the target track and stopping the movement of the pickup if the counted number of mirror signals equals the predetermined number of tracks;
   (d) determining a respective interval length for each mirror signal if the counted number of mirror signals does not equal the predetermined number of tracks;
   (e) comparing the respective interval lengths of two successive mirror signals to determine if there is a difference in interval length; and
   (f) correcting the counted number of mirror signals by adding or subtracting a correction value to the counted number of mirror signals if there is a difference in interval length between the two successive mirror signals.

2. The method according to claim 1, wherein the step of comparing comprises the steps of:
   (e1) dividing the tracks of the disk into an acceleration region, a maximum speed region, and a deceleration region, where in the acceleration region an interval length for a mirror signal associated with a preceding track is greater than an interval length for a mirror signal associated with a present track, in the maximum speed region the interval length for the mirror signal associated with the preceding track is equal to the interval length for the mirror signal associated with the present track, and in the deceleration region the interval length for the mirror signal associated with the preceding track is less than the interval length for the mirror signal associated with the present track;
   (e2) returning to step (b) if all conditions identified in step (e1) are satisfied;
   (e3) determining if a focus error has occurred;
   (e4) stopping the movement of the pickup if a focus error has occurred;
   (e5) determining if a mirror signal interval associated with a track succeeding the present track has been counted within a predetermined time period;
   (e6) stopping the movement of the pickup if the mirror signal interval associated with the track succeeding the present track has not been counted within the predetermined time period; and
   (e7) proceeding to step (f) if the mirror signal interval associated with the track succeeding the present track has been counted within the predetermined time period.

3. The method according to claim 1, wherein the step of correcting comprises the steps of:
   (f1) dividing a mirror signal interval associated with a present track by a mirror signal interval associated with a preceding track to obtain a quotient; and
   (f2) adding the quotient to a current counted number of mirror signals.

4. The method according to claim 2, wherein predetermined time periods corresponding to the acceleration, the maximum speed, and the deceleration regions, respectively, are stored within a processing unit.

5. The method according to claim 1, wherein the step of counting is performed by a system control unit.

6. The method according to claim 1, further comprising the step of returning to step (b) after the step of correcting.

7. A method for performing a seek control operation for a disk device of the type having a pickup for reading/writing data from and to a disk, said method comprising the steps of:
   (a) moving the pickup of the disk device towards a target track of the disk;
   (b) counting the number of mirror signals detected during movement of the pickup, where each mirror signal is associated with a respective track radially arranged on the disk;
   (c) determining if movement of the pickup has been completed by comparing the counted number of mirror signals to a predetermined number of tracks required to reach the target track and stopping the movement of the pickup if the counted number of mirror signals equals the predetermined number of tracks;
   (d) checking respective interval lengths of successive mirror signals;
   (e) determining whether said successive mirror signal interval lengths satisfy a predetermined relationship;
   (f) returning to step (b) if said predetermined relationship is satisfied;
   (g) determining whether an interval length of a mirror signal associated with a succeeding track of said successive mirror signals has been counted within a predetermined time if said successive mirror signal interval lengths do not satisfy said predetermined relationship;
   (h) executing a correction mode if said interval length of the mirror signal associated with the succeeding track has been counted within said predetermined time; and
   (i) executing a forced stop mode for said pickup if said interval length of the mirror signal associated with the succeeding track has not been counted within said predetermined time.

8. The method according to claim 7, wherein the step of executing further comprises the step of returning to step (b) if the executing step is satisfied.

9. The method according to claim 7, wherein said predetermined relationship is defined by dividing the tracks of the disk into an acceleration region, a maximum speed region, and a deceleration region, where in the acceleration region an interval length for a mirror signal associated with a preceding track is greater than an interval length for a mirror signal associated with a present track, in the maximum speed region the interval length for the mirror signal associated with the preceding track is equal to the interval length for the mirror signal associated with the present track, and in the deceleration region the interval length for the mirror signal associated with the preceding track is less than the interval length for the mirror signal associated with the present track.

10. A method for performing a seek control operation for a disk device of the type having a pickup for reading/writing data from and to a disk, said method comprising the steps of:

(a) moving the pickup of the disk device towards a target track of the disk;

(b) counting the number of mirror signals detected during movement of the pickup, where each mirror signal is associated with a respective track radially arranged on the disk;

(c) determining if movement of the pickup has been completed by comparing the counted number of mirror signals to a predetermined number of tracks required to reach the target track and stopping the movement of the pickup when the counted number of mirror signals equals the predetermined number of tracks; and (d) checking respective interval lengths of successive mirror signals when the counted number of mirror signals does not equal to the predetermined number of tracks thereby to execute a force to stop the pickup if there is a difference between the interval lengths.

11. The method according to claim 10, wherein said successive mirror signals are two.

* * * * *